United States Patent
Douglas (10) Patent No.: US 11,407,489 B2
(45) Date of Patent: Aug. 9, 2022

(54) DUCT STRINGER

(71) Applicant: AIRBUS OPERATIONS LIMITED, Bristol (GB)

(72) Inventor: Paul Douglas, Bristol (GB)

(73) Assignee: Airbus Operations Limited, Bristol (GB)

( * ) Notice: Subject to any disclaimer, the term of this patent is extended or adjusted under 35 U.S.C. 154(b) by 367 days.

(21) Appl. No.: 16/451,233

(22) Filed: Jun. 25, 2019

(65) Prior Publication Data

US 2020/0001970 A1    Jan. 2, 2020

(30) Foreign Application Priority Data

Jun. 29, 2018  (GB) ...................... 1810737

(51) Int. Cl.
    *B64C 3/18* (2006.01)
    *F16L 41/08* (2006.01)

(52) U.S. Cl.
    CPC ............ *B64C 3/182* (2013.01); *F16L 41/086* (2013.01)

(58) Field of Classification Search
    CPC . F16L 5/08; F16L 41/06; F16L 41/086; F16L 41/14; F16L 41/04; F16L 41/045; F16L 41/065; B64C 3/182
    See application file for complete search history.

(56) References Cited

U.S. PATENT DOCUMENTS

| | | | |
|---|---|---|---|
| 3,596,936 A | 8/1971 | Dieckmann et al. | |
| 4,138,779 A | 2/1979 | Weber | |
| 4,631,212 A * | 12/1986 | Shifflett | ................. F16L 41/03 |
| 5,380,382 A | 1/1995 | Izdebski | |
| 5,673,472 A | 10/1997 | Muller | |
| 8,979,473 B2 | 3/2015 | Lussier et al. | |
| 9,890,806 B2 | 2/2018 | Erb et al. | |
| 9,895,851 B2 | 2/2018 | Reeves et al. | |
| 2008/0303273 A1* | 12/2008 | Masarwa | ................ F16L 41/14 |
| 2010/0084079 A1 | 4/2010 | Hayden et al. | |
| 2011/0036949 A1 | 2/2011 | Depeige | |
| 2013/0316147 A1 | 11/2013 | Douglas et al. | |
| 2015/0336656 A1* | 11/2015 | Rolfes | ..................... B64C 3/182 |
| 2016/0052617 A1* | 2/2016 | Rolfes | ..................... B64C 3/182 |
| 2016/0129985 A1 | 5/2016 | Mohanty et al. | |

FOREIGN PATENT DOCUMENTS

| | | |
|---|---|---|
| CN | 201487461 | 5/2010 |
| DE | 197 51 124 | 4/1999 |
| EP | 0 440 896 | 8/1991 |
| EP | 1 664 558 | 6/2006 |

(Continued)

OTHER PUBLICATIONS

Search Report for GB1810737.5 dated Dec. 11, 2018, 4 pages.
Extended European Search Report for European Application No. 19177437.1, nine pages, dated Oct. 30, 2019.

*Primary Examiner* — Zachary T Dragicevich (74) *Attorney, Agent, or Firm* — Nixon & Vanderhye P.C.

(57) ABSTRACT

A duct stringer is disclosed and forms at least part of a duct with a closed cross-section along which a fluid flows. An aperture is formed through a duct wall of the duct stringer and communicates with the duct. An insert is adhered in the duct stringer and is configured to engage with a fastening member to mount a fluid transporting conduit, such as a pipe, over the aperture.

17 Claims, 6 Drawing Sheets

(56) References Cited

FOREIGN PATENT DOCUMENTS

| | | |
|---|---|---|
| EP | 2 283 965 | 2/2011 |
| EP | 2 390 514 | 11/2011 |
| FR | 2096234 | 2/1972 |
| FR | 2872253 | 12/2005 |
| JP | 2003214585 | 7/2003 |
| JP | 2007260937 | 10/2007 |
| WO | 2005/031176 | 4/2005 |
| WO | 2007/144563 | 12/2007 |
| WO | 2012/101439 | 8/2012 |

\* cited by examiner

DUCT STRINGER

CROSS RELATED APPLICATION

This application claims priority to United Kingdom (GB) Patent Application 1810737.5, filed Jun. 29, 2018, the entire contents of which are hereby incorporated by reference.

FIELD OF THE INVENTION

The present invention relates to a duct stringer. The present invention also relates to an aircraft assembly, an aircraft and a method of fluidly connecting a fluid transporting conduit to a duct of a duct stringer.

BACKGROUND OF THE INVENTION

US2013/0316147 discloses a stringer adapted to transport fluid in an aircraft wing. The stringer may be adapted to provide venting to one or more fuel tanks in the aircraft wing, or it may be adapted to provide fuel to the one or more fuel tanks. A downpipe is provided for providing a fluidic connection between the stringer and a fuel tank.

SUMMARY OF THE INVENTION

According to an aspect of the invention, there is provided a duct stringer forming at least part of a duct with a closed cross-section which is adapted to transport fluid, the duct stringer comprising: a duct wall; an aperture through the duct wall communicating with the duct; and an insert adhered in the duct wall; wherein the insert is configured to engage with a fastening member to mount a fluid transporting conduit over the aperture.

With such an arrangement, it is possible to provide a straightforward and stable mounting configuration.

The insert may be adhered in the duct wall by a co-bonded, co-cured or secondary bonded joint.

The duct wall may comprise an internal duct surface. The insert may extend flush with or recessed from the internal duct surface.

As such, it is possible to minimise any build-up of an electrostatic charge resulting from fluid flow through the duct, and to minimise flow disruption.

The duct wall may comprise an external side. The insert may comprise an engaging feature configured to engage with the fastening member. The engaging feature may be on the external side.

The insert may comprise a core forming the engaging feature. An insulating cover may be between the core and the duct wall.

The insulating cover may act to isolate the core from the duct wall.

The engaging feature may be a threaded engagement. The engaging feature may be a female engaging feature.

The duct wall and insert may together form a one-piece component.

The threaded engagement may comprise a helicoil. As such, the threaded engaging feature may be easily removed or replaced.

The insert may be at least partially received by a blind cavity in the duct wall.

The insert may comprise a body, and at least one locating feature may be disposed between the body and the duct wall to space at least part of the body from the duct wall. As such, an even distribution of an adhesive, for example, may be provided about the insert.

The insert may comprise a key, and the duct wall may comprise a keyway, wherein the key is received in the keyway to react a rotational load applied to the insert.

The keyway may comprise a slot in the duct wall.

The aperture may comprise an edge and the slot may extend from the edge.

The duct wall may comprise a shoulder in the slot against which the key locates.

The duct wall may have an external surface, and the key may locate against an opposing side of the shoulder to the external surface.

At least part of the key may be located between the shoulder and the fluid transporting conduit, when mounted.

The insert may comprise a male threaded fastener.

The duct wall may be a composite component. The composite material may be a fibre reinforced composite, such as a carbon fibre reinforced plastic.

The duct wall may have a hat-shaped profile and comprises a pair of webs, a pair of feet and a crown, and wherein the aperture is in the crown.

The insert may be one of a plurality of inserts about the aperture.

According to an aspect of the present invention, there is provided an aircraft structural assembly comprising a duct stringer as described above, and a skin, such as an aircraft wing skin.

The aircraft structural assembly may comprise a fluid transporting conduit fluidly connected with the duct, and a fastening member.

The aircraft structural assembly may comprise a seal configured to seal between the duct wall and the fluid transporting conduit.

According to an aspect of the present invention, there is provided an aircraft comprising a duct stringer as described above, and/or the aircraft structural assembly as described above.

According to an aspect of the present invention, there is provided a method of mounting a fluid transporting conduit to a duct of a duct stringer with a closed cross-section which is adapted to transport fluid, the duct stringer having an aperture through a duct wall, the method comprising locating a fluid transporting conduit over the aperture, and engaging a fastening member with an insert adhered in the duct wall to mount the fluid transporting conduit over the aperture.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
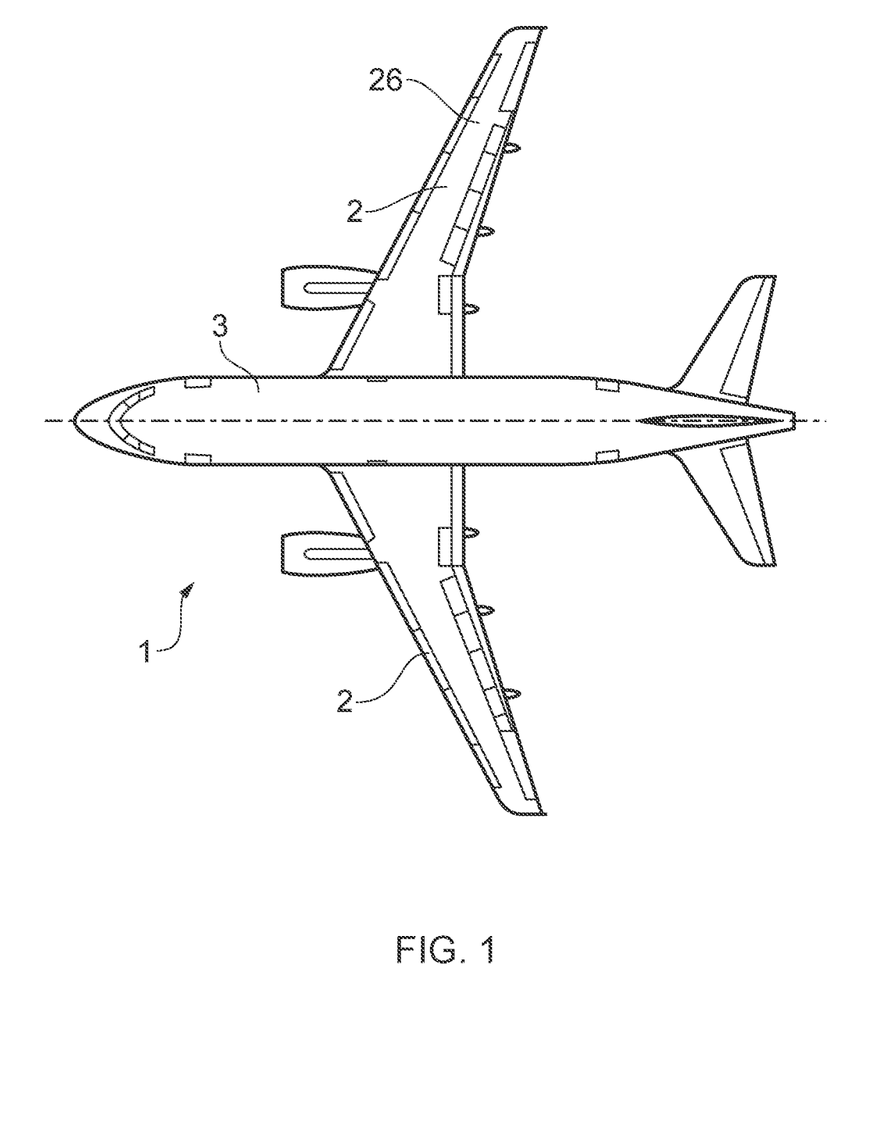
FIG. 1 is a plan view of an aircraft.
Figure 2:
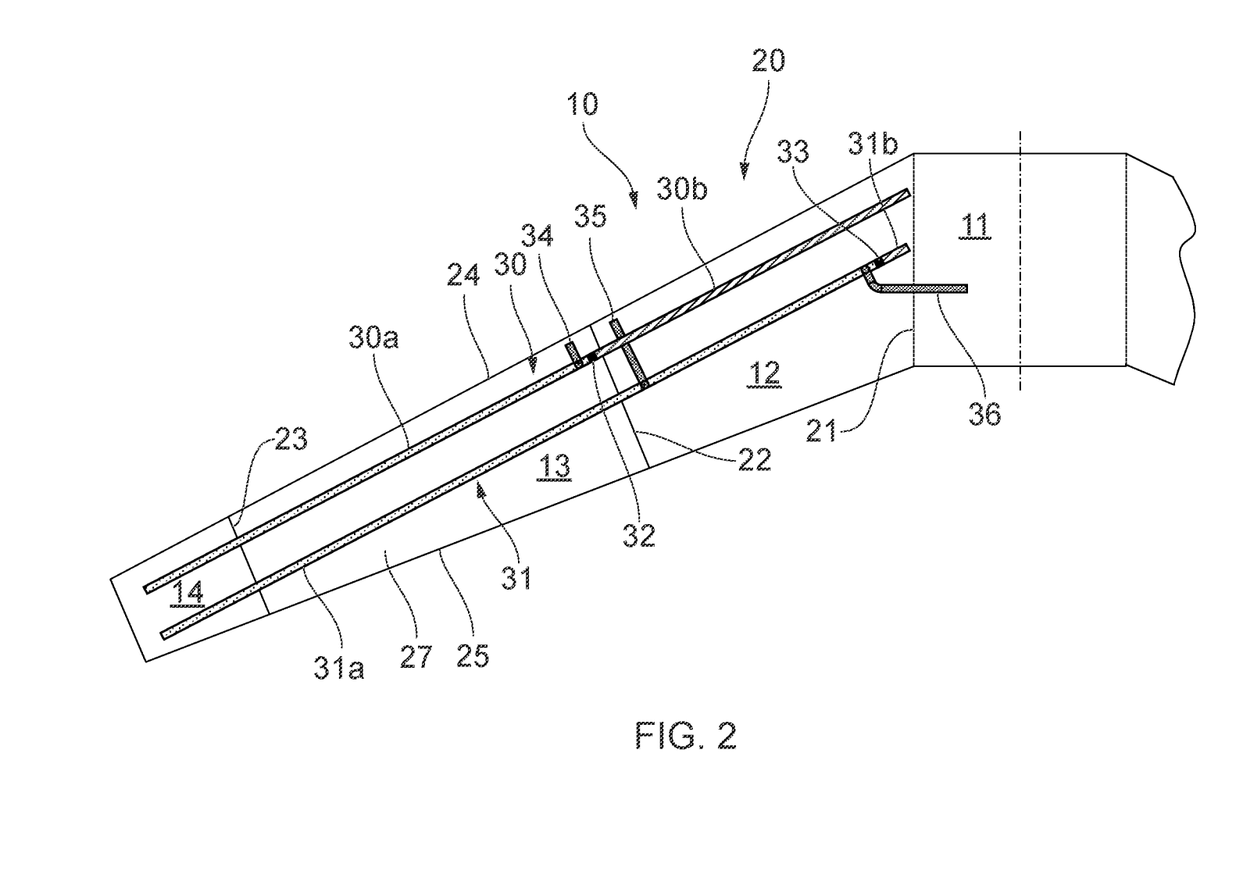
FIG. 2 is a schematic view of a wing with a fuel system.

FIG. 1 is a plan view of an aircraft 1 comprising a pair of wings 2 and a fuselage 3. FIG. 2 is a plan view of certain elements of a fuel system 10 of the aircraft 1, including a centre fuel tank 11 inside the fuselage 3, and wing tanks 12-14 inside the wing 2. The wing tanks 12-14 comprise an inboard fuel tank 12, an outboard fuel tank 13 and a surge tank 14. The tanks 12-14 are separated by ribs 21-23. Further ribs, not shown, are disposed between ribs defining the tanks 12-14.

The wing tanks 12-14 are bounded fore and aft by forward and rearward spars 24, 25. The upper and lower boundaries of the wing tanks 12-14 are provided by an upper wing skin 26 and a lower wing skin 27. Each wing skin is stiffened by stringers running span-wise along the length of the wing. Two of the stringers attached to the upper wing skin 26 are so-called "duct stringers" 30, 31 which are shown in FIG. 2. The other stringers attached to the upper wing skin 26 are not shown in order to simplify the drawing.

Each duct stringer 30, 31 includes a duct portion 30a, 31a outboard of an internal bulkhead 32, 33; and a non-duct portion 30b, 31b inboard of the internal bulkhead 32, 33.

The duct portion 30a of the duct stringer 30 is in fluid communication with the outboard fuel tank 13 via an interconnecting pipe 34. The duct portion 31a of the duct stringer 31 is in fluid communication with the inboard fuel tank 12 via an interconnecting pipe 35. The duct portion 31a of the duct stringer 31 is also in fluid communication with the centre fuel tank 11 via an interconnecting pipe 36. Each interconnecting pipe 34-36 acts as a fluid conduit. Optionally, the distal end of each interconnecting pipe 34-36 is fitted with a bell mouth or float valve, not shown.

During operation of the aircraft, the duct stringers 30, 31 are used to transport air in either direction between the surge tank 14 and the fuel tanks 11-13 in order to manage the air pressure within the tanks. So each duct stringer 30, 31 has two functions: stiffening the upper wing skin; and providing a duct which transports air to the surge tank 14.

Each duct stringer 30, 31 acts as a structural component of the aircraft 1. Each duct stringer 30, 31, acting as an aircraft structural component, forms part of an aircraft assembly 20. The aircraft structural components form part of an airframe of the aircraft 1.

Figure 3:
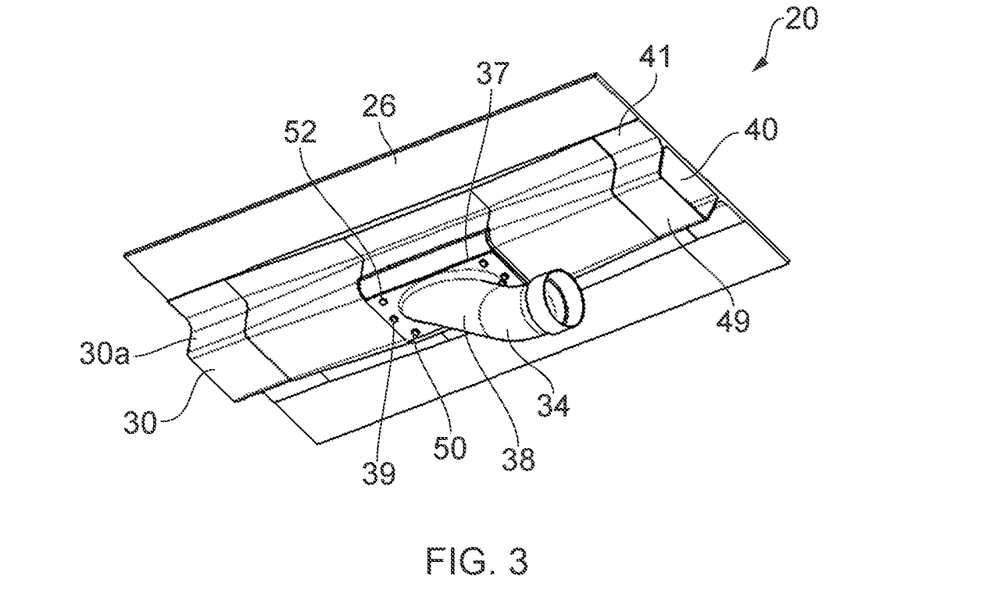
FIG. 3 is a partial perspective view of an upper wing skin and a duct stringer forming a fluid transporting duct with an interconnecting pipe mounted thereto by a fastening configuration.

Referring now to FIG. 3, a partial view of the upper wing skin 26 and one of the duct stringers 30 is shown. FIG. 3 shows a section of the duct portion 30a of the duct stringer 30. The duct stringer 30 and the upper wing skin 26 together form an aircraft assembly. Interconnecting pipe 34 is connected to the duct stringer 30 by a fastening configuration 50.

Interconnecting pipe 34 acts as a fluid conduit. In the present embodiment, the fluid conduit is an elbow joint. Interconnecting pipe 34 comprises a base 37 and a pipe section 38. The base 37 is a flange at one end of the pipe section 38. A flow path is defined through the interconnecting pipe 34 and is open at the base 37. Mounting holes 39 are formed in the base 37. The mounting holes 39 are distributed about the base 37. The mounting holes 39 are configured to align with corresponding features on the duct stringer 30 as will be described below. The pipe section 38 extends from one side of the base 37. A bolt 52 is receivable through each mounting hole 39 to connect the interconnecting pipe 34 to the duct stringer 30. The bolts 52 each act as a fastening member.

Figure 4:
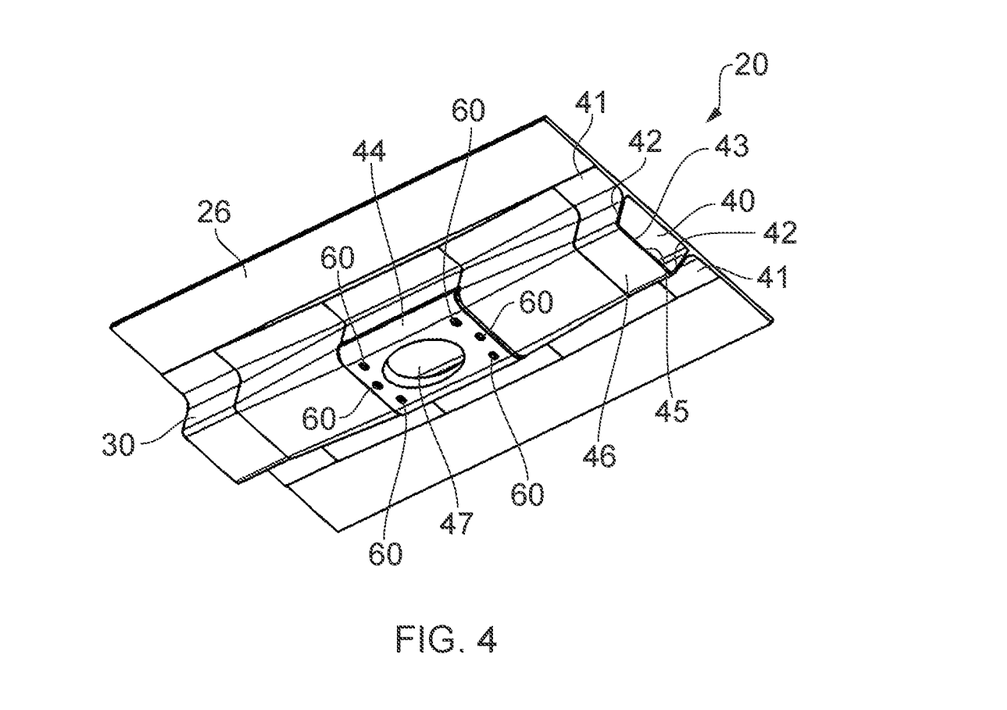
FIG. 4 is a partial view of the upper wing skin and the duct stringer of FIG. 3 with the interconnecting pipe removed.

Referring to FIG. 4, the aircraft structural assembly 20 comprising the upper wing skin 26 and the duct stringer 30 is shown with the interconnecting pipe 34 removed. The interconnecting pipe 34 is removable from the aircraft structural assembly 20 to provide for straightforward repair and/or replacement.

The duct stringer 30 and the upper wing skin 26 are integrally formed. The duct stringer 30 defines a duct 40. The duct is configured to transport a fluid. The skin 26 is on one side of the duct 40. The duct 40 has a closed cross-section which is adapted to transport a fluid. The duct 40 may be adapted to transport a gas and/or a liquid. It will be understood that the duct stringer 30 may be on another component. For example, the duct stringer 30 may be provided on the lower skin 27.

The duct stringer 30, acting as an aircraft structural component, comprises a duct wall 49. The duct stringer 30 comprises a pair of feet 41, a pair of webs 42 and a crown 43. The crown 43 defines a panel section of the duct wall 49. The pair of feet 41 are adhered to the upper wing skin 26.

The duct stringer 30 is formed from a carbon fibre reinforced plastic. Alternative materials, such as an alternative composite material, may be used to form the duct stringer 30. The upper wing skin 26 is formed from a carbon fibre reinforced plastic. Alternative materials, such as an alternative composite material, may be used to form the upper wing skin 26. The duct stringer 30 and the upper wing skin 26 may be co-cured, co-bonded or secondary bonded together to form an assembly.

The thickness of different portions of the duct stringer 30 may vary. In one embodiment, the thickness is varied by means of bearing the number of plies. The duct stringer 30 comprises a reinforcing panel 44. The duct stringer 30 has an internal duct surface 45 and an external surface 46. The reinforcing panel 44 is on an external side. The reinforcing panel 44 may be integrally formed with the remainder of the duct stringer 30 or may be omitted. The reinforcing panel 44 forms part of the duct wall 49. An aperture 47 is formed through the duct stringer 30. In the present embodiment, the aperture 47 is formed through the crown 43 of the duct stringer 30, although the aperture 47 may in one embodiment be formed through one of the pair of webs 42. The aperture 47 extends from the external surface 46 to the internal duct surface 45. The reinforcing panel 44 forms part of the external surface 46.

Inserts 60 are received in the duct wall 49 of the duct stringer 30. Inserts 60 are distributed about the aperture 47. Each insert 60 is received in the crown 43. Inserts 60 are fixedly received in the duct wall 49. The inserts 60 are adhered in the duct wall 49. Each insert 60 is configured to engage with a corresponding one of the bolts 52, acting as a fastening member. The inserts 60 provide for the interconnecting pipe 34, acting as a fluid transporting conduit, to be mounted to the duct stringer 30. Three inserts 60 are disposed on one side of the aperture 47 and three further inserts 60 are disposed on an opposing side of the aperture 47. Although six inserts are shown, it will be understood that the number and distribution of the inserts 60 may vary.

Figure 5:
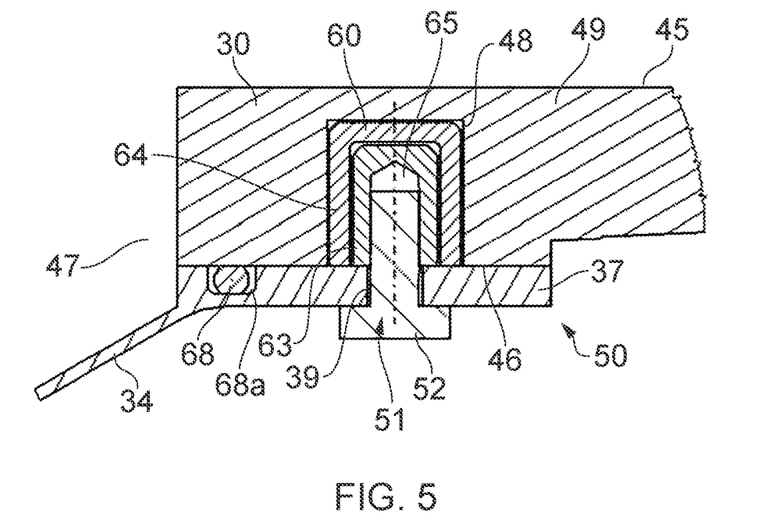
FIG. 5 is a partial cross-sectional view of part of the interconnecting pipe mounted to the duct stringer with a fastener.
Figure 6:
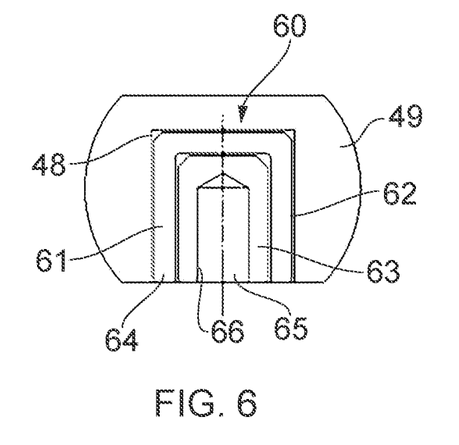
FIG. 6 is a cross-sectional view of an insert of the fastener in part of the duct stringer.

Referring now to FIGS. 5 and 6, cross-sectional views of one of the inserts 60 received in the duct wall 49 is shown. The insert 60 has a generally cylindrical shape, although it will be appreciated that the shape of the insert 60 may vary. Different means of retaining the insert 60 in the duct stringer 30 are envisaged. For example, the insert 60 may be adhered by a co-cured, co-bonded, or secondary bonded joint in the duct wall 49. As such, the insert 60 may be adhered by means of one of co-curing, co-bonding or secondary bonding in the duct stringer 30. An adhesive, may be applied between the insert 60 and the surrounding material. Such means, or further means such as a mechanical fixing, may be used to permanently locate the insert 60 in the duct stringer 30.

In FIG. 5, a section of the duct stringer 30 is shown assembled with a section of interconnecting pipe 34. The bolt 52, acting as the fastening member, is engaged with insert 60 to mount the interconnecting pipe 34 to the duct stringer 30. Each of the inserts 60 is received in a recess 48 formed in the duct wall 49. The recess 48 is a blind cavity. That is, the recess 48 does not extend through the thickness of the duct stringer 30. The recess 48 has an opening on the external surface 46. The depth of the recess 48 is less than the thickness of the duct wall 49. The insert 60 is therefore recessed from the internal duct surface 45. That is, the insert 60 does not extend to the internal duct surface 45. In one embodiment, the recess 48 extends through the thickness of the duct stringer 30. The insert 60 is received in such a recess 48 so that the insert 60 is flush with or recessed from the internal duct surface 45. By preventing the insert 60 or a related component from protruding into the duct 40, it is possible to restrict the build-up of an electrostatic charge and/or prevent any interference with the fluid flow through the duct 40.

The height of the insert 60 is less than or equal to the thickness of the duct wall 49.

The insert 60 comprises a body 61, which in the present arrangement is cylindrical. The body 61 has an outer face 62. The outer face 62 interacts with the surface of the recess 48 to retain the insert 60 in the recess 48. In embodiments, the insert 60 comprises locating features, not shown, which are disposed between the body 61 of the insert 60 and the surface of the recess 48 to space the body 61 from the recess surface. The locating features provide a consistent gap between the body 61 and the recess surface to allow a consistent distribution of an adhesive, where used, around the insert 60. The locating features may be one or more ribs, for example, or the surface of the recess 48. The locating features, not shown, may form an interference fit between the surface of the recess 48 and the body 61 of the insert 60.

Figure 8:
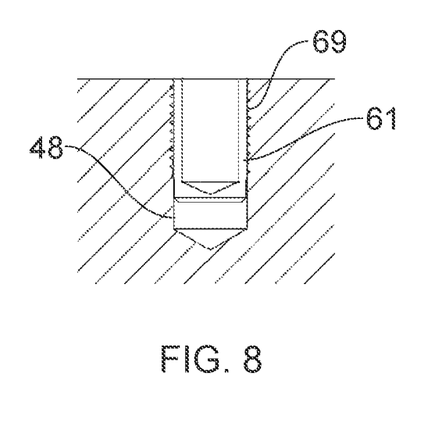
FIG. 8 is a cross-sectional view of an alternative insert of the fastener in the duct stringer.

In an embodiment shown in FIG. 8, a helical thread 69 is formed on a peripheral face of the body 61. The helical thread 69 mechanically engages with the surface of the recess 48. A corresponding female thread may be formed in the surface of the recess 48. Alternative mechanical engagements may be used.

The insert 60 of FIGS. 5 and 6 has a plural part configuration. The body 61 has a two-part arrangement. The body 61 has a core 63 and a cover 64. The cover 64 is disposed between the core 63 and the portion of the duct stringer 30 in which the insert 60 is received. The core 63 and the cover 64 are formed as a one-part component. The core 63 is overmoulded by the cover 64 to the one-part component. A mechanical locking feature such as a knurled surface, not shown, is incorporated onto an external face of the core 63 to assist with the connection of the core 63 and the cover 64. Alternative means may be used.

A bore 65 is formed in the insert 60. The bore 65 is formed in the core 63 and is open at one end of the insert 60. The cover 64 does not extend over the bore 65. The bore 65 extends part way through the core 63. In an alternative arrangement the bore 65 extends through the core 63. The core 63 is formed from a metallic material.

The insert 60 defines an engaging feature 66. The engaging feature 66 is a female thread. The female thread is formed in the bore 65. In the present arrangement, the female thread is formed by a helicoil, removably engaged in the insert 60. An engaging thread may be formed in the core 63. The use of a helicoil allows for the engaging feature 66 to be repaired should damage occur. The provision of the inserts 60 in the duct stringer 30 helps to restrict damage occurring to the duct stringer 30. The inserts 60 also provide for ease of removal and engagement of the interconnecting pipe 34 to the duct stringer 30. The use of a metallic insert 60 helps to reinforce the fastening configuration 50.

The cover 64 of the body 61 acts as an insulator. The cover 64 forms a sleeve extending around the core 63 received in the recess 48. The core 63 is formed from a metallic material such as stainless steel. The cover 64 is formed from an insulating material, such as nylon or PTFE. The provision of the insulating cover 64 may assist with a lightning strike situation, for example.

The provision of the insert 60 in the blind cavity aids with sealing, as it prevents a leak path through the thickness of the duct stringer 30. A seal 68 is provided between the interconnecting pipe 34 and the duct stringer 30 to provide a fluid seal. The seal 68 seals around the aperture 47 in the duct stringer 30. By preventing a leak path via the insert arrangements it is possible to provide the seal 68 on an inner side of the inserts 60 arrangement. As such, the sealing interface is simplified. The seal 68 is an o-ring, although alternative sealing arrangements are envisaged.

The inserts 60 form a one-piece component with the duct stringer 30. To connect the interconnecting pipe 34, acting as a fluid conduit, with the duct 40, the interconnecting pipe 34 is brought into abutment with the duct stringer 30. The interconnecting pipe 34 is aligned with the aperture 47. That is, the interconnecting pipe 34 is disposed over the aperture 47. The seal 68 is received in a corresponding channel 68a in the base 37 of the interconnecting pipe 34. The seal 68 provides a seal between the base 37 and the external surface 46 of the duct stringer 30.

As shown in FIG. 5, the inserts 60 are flush with the external surface. The inserts 60 may be retracted from the external surface 46. As such, the inserts 60 do not protrude from the surface of the duct stringer 30. Such an arrangement may assist with locating and sealing of the interconnecting pipe 34 with the duct stringer 30. As shown herein, the insert 60 forms the female engaging feature 66 which engages with the bolts 52, acting as male engaging features. Although not shown, it will be understood that the insert 60 may form a male engaging feature, such as a threaded member protruding from the external surface 46, which engages with a corresponding fastening member such as a nut.

When the interconnecting pipe 34 is brought into abutment with the duct stringer 30, the mounting holes 39 are aligned with the exposed side of each insert 60. Bolts, acting as fastening members 52, are inserted through the mounting holes 39 to be received by the inserts 60. Each bolt 52 releasably engages with the corresponding insert 60 to mount the interconnecting pipe 34. Each insert 60 and fastening member together form a fastener 51. When the bolts 52 are fastened, the base 37 of the interconnecting pipe 34 is retained in abutment with the external surface 46 of the duct stringer 30. A suitable fastening torque is applied to the bolts 52 to mount the interconnecting pipe 34. The integral mounting of the inserts 60 in the duct stringer 30 provide for a suitable torque to be applied, whilst minimising the risk of any damage occurring to the duct stringer 30. A sealed fluid flow path is therefore formed through the interconnecting pipe 34 into the duct 40.

The interconnecting pipe 34 is removable and/or interchangeable by disconnecting the bolts 52 from the inserts 60 and removing the interconnecting pipe 34 from the duct stringer 30.

Figure 7:
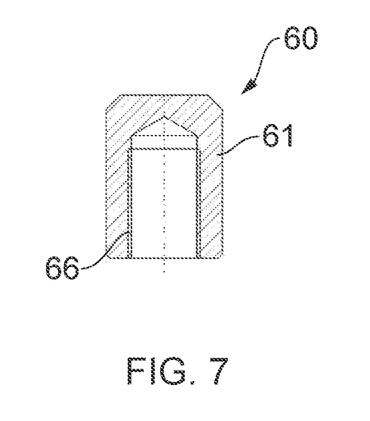
FIG. 7 is a cross-sectional view of an alternative insert of the fastener.

Although in the above described embodiment the body 61 of the inserts 60 has a two-part construction, it will be understood that the insert 60 may have a one-part construction. In such an embodiment as shown in FIG. 7, the cover 64 is omitted.

Figure 9:
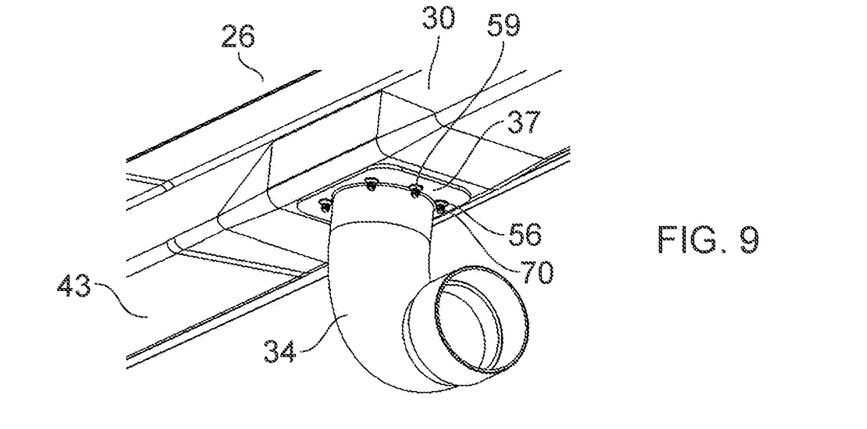
FIG. 9 is a partial perspective view of an upper wing skin and a duct stringer forming a fluid transporting duct with an interconnecting pipe mounted thereto by another fastening configuration.

Another embodiment for connecting the interconnecting pipe 34 to the duct stringer 30 with an alternative insert arrangement will now be described. Such an embodiment is shown in FIGS. 9 to 14. FIG. 9 shows the duct stringer 30 on the upper wing skin 26 with the interconnecting pipe 34 mounted to the duct stringer 30. The general configuration of the interconnecting pipe 34, the duct stringer 30 and the upper wing skin 26 is generally the same as described above and so a detailed description will be omitted herein. However, the mounting arrangement of the interconnecting pipe 34 with the duct stringer 30 is different. An alternative insert arrangement will now be described with reference to the FIGS. 9 to 14. Components and features having generally the same configuration will retain the same reference numerals.

Figure 10:
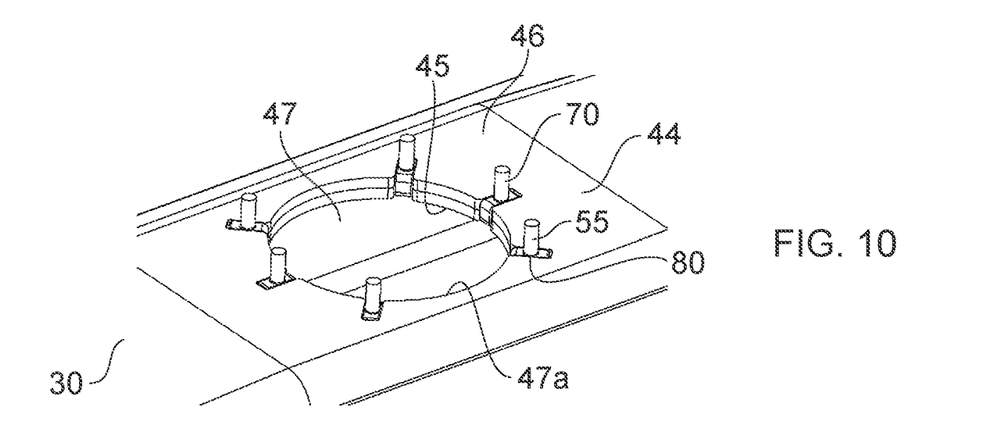
FIG. 10 is a partial perspective view of the upper wing skin and a duct stringer of FIG. 9, with the interconnecting pipe removed.
Figure 11:
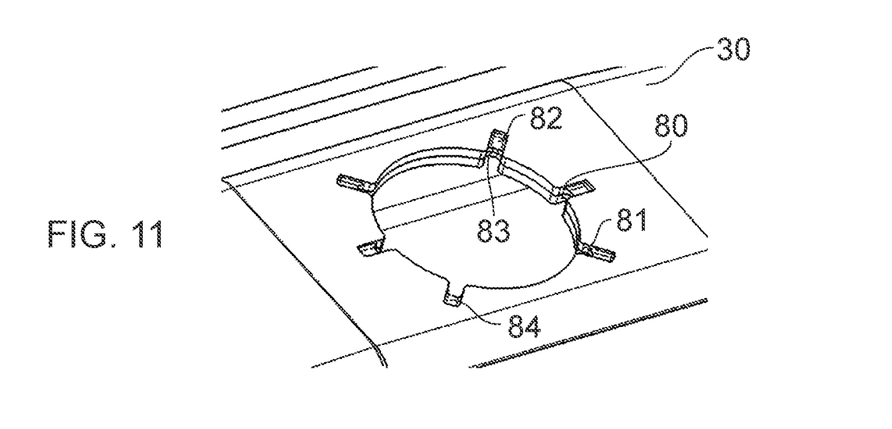
FIG. 11 is a partial perspective view of a partially formed duct stringer.

As described previously, the aperture 47 is formed through the duct stringer 30 between the external surface 46 and the internal duct surface 45. The aperture 47 therefore defines a fluid flow path through the duct stringer 30 from the duct 40. The aperture 47 has an aperture edge 47a defining the periphery of the aperture 47. The duct stringer 30 comprises the reinforcing panel 44, which may be integrally formed or may be omitted, through which the aperture 47 is formed. It will be understood that the aperture 47 may be formed elsewhere in the duct stringer 30.

The base 37 of the interconnecting pipe 34, acting as a fluid conduit, abuts against the crown 43 of the duct stringer 30.

Fastening members 56 engage with inserts 70 to mount the interconnecting pipe 34 to the duct stringer 30. Each insert 70 engages with a corresponding one of the fastening members 56 to provide a fastener 59. The fasteners 59 are distributed about the aperture 47. Such an arrangement provides a distributed connection about the aperture 47. In FIG. 10, six inserts 70 are shown distributed about the aperture 47. The inserts 70 extend to the aperture edge 47a. The number of inserts 70, and therefore the number of fasteners 59, may vary.

The insert 70 comprises a key 71 (refer, in particular to FIGS. 12 and 13) which is configured to be received in a corresponding keyway 80 of the duct stringer 30. The insert 70 has an engaging feature 55. The engaging feature 55 is a male threaded member. The male threaded member is configured to engage with the fastening member 56. The fastening member 56 is a nut. A washer 57 is retained on the male threaded member by the nut 56. It will be understood that an alternative engaging feature 55 and corresponding fastening member 56 arrangement may be used.

Figure 12:
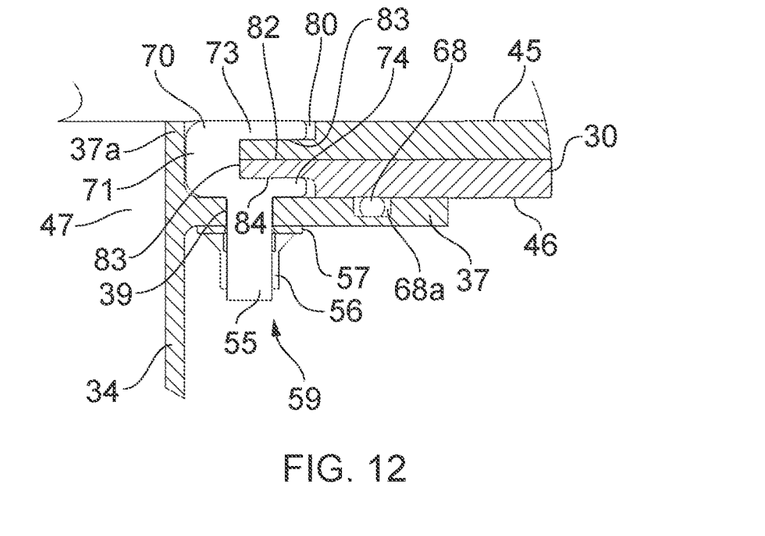
FIG. 12 is a partial cross-sectional view of the fastening configuration of FIG. 10.
Figure 13:
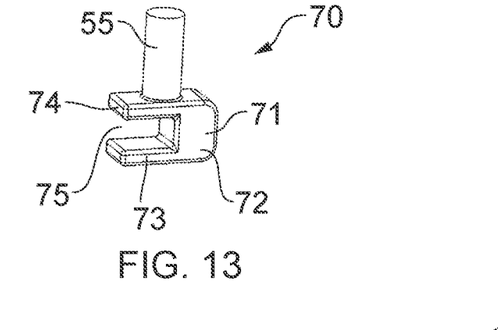
FIG. 13 is a perspective view of an insert of the fastening configuration of FIG. 10.

The engaging feature 55 extends from the key 71. The key 71 comprises a body 72. An internal lug 73 and an external lug 74 extend from the body 72 and define a channel 75 there between. The internal lug 73 and the external lug 74 are planar. In embodiments, one or both of the internal lug 73 and the external lug 74 may be omitted. The engaging feature 55 is integrally formed with the key 71. The engaging feature 55 and the key 71 are formed as a one-piece component. The engaging feature 55 in one embodiment may be a stud which is integrally moulded with the key 71. In the present embodiment, the insert 70 is formed from a metallic material. The insert 70 is formed with a core which is coated with an insulating cover, not shown. The insulating cover acts to electrically isolate the core from the surrounding material of the duct stringer 30. The metallic material is a stainless steel. The cover is formed from an insulating material such as nylon or a PTFE. Other suitable materials may be used.

The key 71 of the insert 70 is received in a keyway 80. The keyway 80 comprises a slot 81. The slot 81 is a recess formed in the duct stringer 30. The slot 81 extends radially from the aperture edge 47a. Each insert 70 has a corresponding keyway 80. The insert 70 is received in the slot 81. The engaging feature 55 extends from the external surface 46. The insert 70 forms a one-piece component with the duct stringer 30. The insert 70 may be co-cured, co-bonded or secondary bonded with the duct stringer 30. As such, the insert 70 is adhered with the duct stringer 30.

The slot 81 extends between the external surface 46 and internal duct surface 45. A shoulder 82 is disposed in the slot 81. The shoulder 82 forms part of the duct stringer 30. The shoulder 82 is recessed from the external surface 46 and the internal duct surface 45. The shoulder 82 is received in the channel 75 of the insert 70. A shoulder edge 83 is recessed from the aperture edge 47a. As such, the body 72 of the key 71 is received between the aperture edge 47a and the shoulder 82. The key 71 extends flush with or recessed from the aperture edge 47a. With such an arrangement, the key 71 is retained between the shoulder and part of the interconnecting pipe 34 as will be described below.

The internal lug 73 is disposed on an opposing side of the shoulder 82 from the external surface 46. As such, when the engaging feature 55 is engaged with the fastening member 56, the tensile force is reacted through the shoulder 82. As such, the load carrying capacity of the fastener 59 may be maximised. The insert 70 extends flush with the internal duct surface 45. Alternatively, the insert 70 is recessed from the internal duct surface 45. With such an arrangement, it is possible to minimise any electrostatic build-up or flow interruption through the duct 40.

The key 71 lies flush with the external surface 46. Alternatively, the key 71 is recessed from the external surface 46. Such arrangements help to simplify the sealing of the interconnecting pipe 34 with the duct stringer 30.

Figure 14:
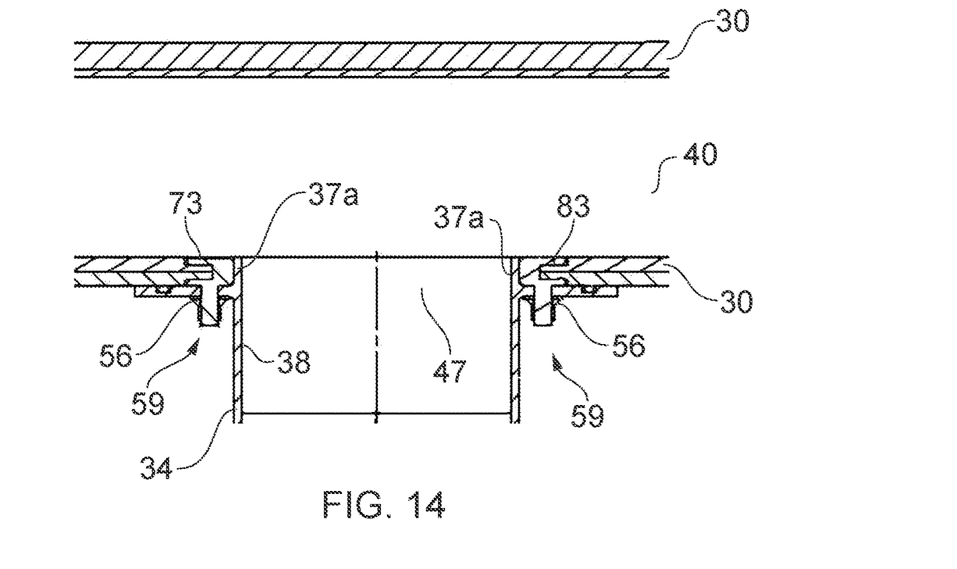
FIG. 14 is a partial cross-sectional view of an upper wing skin and a duct stringer forming a fluid transporting duct with an interconnecting pipe mounted thereto of FIG. 9.

The key 71 received in the slot 81 is able to react a torsional load of the key acting in the keyway 80. The interconnecting pipe 34, acting as the fluid conduit, includes the base 37 at one end of the pipe section 38. The base 37 forms a flange. The base 37 covers the slots 81. A spigot 37a extends on an opposing side of the base 37 to the pipe section 38. The spigot is shown in FIG. 14. The spigot 37a has the same cross-sectional diameter and profile as the pipe section 38. The spigot 37a extends from the end of the pipe section 38. When assembled, the spigot 37a of the interconnecting pipe 34 locates against the aperture edge 47a. The length of the spigot 37a corresponds to the thickness of the duct stringer 30 at the aperture 47. As such, the spigot 37a extends flush with the internal duct surface 45. Alternatively, the spigot 37a may be recessed therefrom. The spigot 37a of the interconnecting pipe 34 locates adjacent to the key 71. The key 71 is therefore retained between the shoulder 82 and the spigot 37a. As such, this arrangement assists retention of the key 71 in the keyway 80.

The internal lug 73 locates against an internal face 83 of the shoulder when the shoulder is received in the channel 75. The external lug 74 locates against an external face 84 of the shoulder 82 when the shoulder 82 is received in a channel 75.

To mount the interconnecting pipe 34 with the duct stringer 30, the base 37 of the interconnecting pipe 34 is brought towards the duct stringer 30. The mounting holes 39 in the base 37 are aligned with the engaging features 55 of the inserts 70. Upon alignment, each engaging feature 55 is inserted through the corresponding mounting hole 39. The base is brought into contact with the external surface 46. The seal 68 in the seal channel 68a seals the interconnecting pipe 34 with the duct stringer 30. Each of the engaging features 55 protrude from the corresponding mounting hole 39. The spigot 37a locates against the aperture edge 47a and the key 71. Each nut 56, is engaged with the corresponding engaging feature 55. The washer 57 of each fastener 59 is received between the fastening member 56 and the base 37. A fastening torque is applied to the fastening member 56 to engage with the male threaded member of the engaging feature 55 to tighten the fastener 59 and mount the interconnecting pipe 34. The fastening torque is reacted by the key 71 reacting against the sides of the key way 80. The tensile load is reacted through the shoulder 82 acting on the key 71.

To remove or interchange the interconnecting pipe 34, the fastening members 56 are removed from the engaging features 55 and the pipe may then be withdrawn from the duct stringer 30.

Although, in the above described embodiments, an aircraft structural assembly providing a duct is described by reference to the stringers in the wing, and by reference to the aircraft's fuel tank system, it will be understood that alternative configurations are possible. For example, in embodiments the structural component is a different structural component such as a fuselage stringer or fuselage frame.

In the above described embodiments, the stringer acting as an aircraft structural component and the skin together provide a duct with a closed cross-section which is adapted to transport fluid. It will be understood that in alternative embodiments, an alternative panel may be used together with the structural component to provide the duct.

In embodiments, the duct is configured to transport one or both of a gas and a liquid. For example, the duct may form part of an air distribution system such as cabin air; or may form a fuel supply line.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A duct stringer forming at least part of a duct with a closed cross-section which is adapted to transport fluid, the duct stringer comprising:
    a duct wall;
    an aperture through the duct wall communicating with the duct, and
    an insert adhered in the duct wall,
    wherein the insert is configured to engage with a fastening member to mount a fluid transporting conduit over the aperture, and
    wherein the insert comprises a key, and the duct wall comprises a keyway, wherein the key is received in the keyway to react a rotational load applied to the insert.

2. The duct stringer of claim 1, wherein the duct wall comprises an internal duct surface, and the insert extends at least one of flush with and recessed from the internal duct surface.

3. The duct stringer of claim 1, wherein the duct wall comprises an external side and the insert comprises an engaging feature on the external side configured to engage with the fastening member.

4. The duct stringer of claim 3, wherein the insert comprises a core forming the engaging feature, and an insulating cover between the core and the duct wall.

5. The duct stringer of claim 1, wherein the duct wall and insert together form a one-piece component.

6. The duct stringer of claim 1, wherein the insert is at least partially received by a blind cavity in the duct wall.

7. The duct stringer of claim 1, wherein the insert comprises a body, and at least one locating feature is disposed between the body and the duct wall to space at least part of the body from the duct wall.

8. The duct stringer of claim 1, wherein the duct wall is a composite component.

9. The duct stringer of claim 1, wherein the insert is one of a plurality of inserts about the aperture.

10. A duct stringer forming at least part of a duct with a closed cross-section which is adapted to transport fluid, the duct stringer comprising:
    a duct wall,
    an aperture through the duct wall communicating with the duct, and
    an insert adhered in the duct wall,
    wherein the insert is configured to engage with a fastening member to mount a fluid transporting conduit over the aperture,
    wherein the insert comprises a key, and the duct wall comprises a keyway,
    wherein the key is received in the keyway to react a rotational load applied to the insert, and
    wherein the keyway comprises a slot in the duct wall.

11. The duct stringer of claim 10, wherein the duct wall comprises a shoulder in the slot against which the key locates.

12. The duct stringer of claim 11, wherein the duct wall has an external surface, and the key locates against an opposing side of the shoulder to the external surface.

13. The duct stringer of claim 11, in which at least part of the key is located between the shoulder and the fluid transporting conduit, when mounted.

14. A duct stringer forming at least part of a duct with a closed cross-section which is adapted to transport fluid, the duct stringer comprising:
    a duct wall, an aperture through the duct wall communicating with the duct, and an insert adhered in the duct wall, wherein the insert is configured to engage with a fastening member to mount a fluid transporting conduit over the aperture, wherein the insert comprises a key, and the duct wall comprises a keyway, wherein the key is received in the keyway to react a rotational load applied to the insert, wherein the keyway comprises a slot in the duct wall, and wherein the aperture comprises an edge and the slot extends from the edge.

15. An aircraft assembly comprising the duct stringer of claim 1, and a skin, wherein the duct stringer is adhered to the skin.

16. The aircraft assembly of claim 15, comprising a fluid transporting conduit fluidly connected with the duct, and a fastening member.

17. An aircraft comprising at least one of the duct stringer of claim 1, an aircraft assembly comprising a skin, a duct stringer adhered to the skin, wherein the duct stringer forms at least part of a duct with a closed cross-section which is adapted to transport fluid.

* * * * *